(12) United States Patent
Lee et al.

(10) Patent No.: US 8,442,102 B2
(45) Date of Patent: May 14, 2013

(54) CHIP EQUALIZATION APPARATUS AND METHOD THEREOF

(75) Inventors: Goon Seop Lee, Gyeonggi-do (KR); Sung Hoon Lee, Seoul (KR); Jong Tae Ihm, Gyeonggi-do (KR); Jae Hwang Yu, Seoul (KR); Dong Hahk Lee, Gyeonggi-do (KR); Ku Ik Chung, Seoul (KR); Jin Hee Han, Seoul (KR)

(73) Assignee: SK Telecom Co., Ltd. (KR)

( * ) Notice: Subject to any disclaimer, the term of this patent is extended or adjusted under 35 U.S.C. 154(b) by 682 days.

(21) Appl. No.: 12/520,935

(22) PCT Filed: Dec. 27, 2007

(86) PCT No.: PCT/KR2007/006906
§ 371 (c)(1),
(2), (4) Date: Sep. 10, 2009

(87) PCT Pub. No.: WO2008/078972
PCT Pub. Date: Jul. 3, 2008

(65) Prior Publication Data
US 2010/0068989 A1    Mar. 18, 2010

(30) Foreign Application Priority Data
Dec. 27, 2006   (KR) .................. 10-2006-0134926

(51) Int. Cl.
*H03H 7/30* (2006.01)
*H03K 5/159* (2006.01)

(52) U.S. Cl.
USPC ........... 375/229; 375/231; 375/232; 375/233; 375/234

(58) Field of Classification Search ............... 375/229, 375/232, 234, 219, 236
See application file for complete search history.

(56) References Cited

U.S. PATENT DOCUMENTS

| 5,796,814 A | 8/1998 | Brajal et al. |
| 7,940,738 B2 * | 5/2011 | Gubeskys et al. ............. 370/342 |
| 2004/0127164 A1 * | 7/2004 | Mondragon-Torres et al. ......................... 455/67.11 |
| 2006/0034362 A1 | 2/2006 | Kim et al. |

FOREIGN PATENT DOCUMENTS

| EP | 1 331-782 A2 | 7/2003 |
| KR | 10-2006-0014779 | 2/2006 |
| KR | 10-2006-0039961 | 5/2006 |

* cited by examiner

*Primary Examiner* — Daniel Washburn
*Assistant Examiner* — Qutbuddin Ghulamali
(74) *Attorney, Agent, or Firm* — Baker Hostetler LLC

(57) ABSTRACT

A chip equalization apparatus and method for selecting cluster signals from broadcast signals being continuously received in multi-path channels for extracting a plurality of cluster signals from among the received broadcast signals and using a plurality of chip equalizers each having a tap coefficient update part for updating the tap coefficients of the selected cluster signals when the equalization outputs are combined to compensate the broadcast signals and provide low power consumption and efficient equalization for use in a satellite broadcasting receiving system.

2 Claims, 6 Drawing Sheets

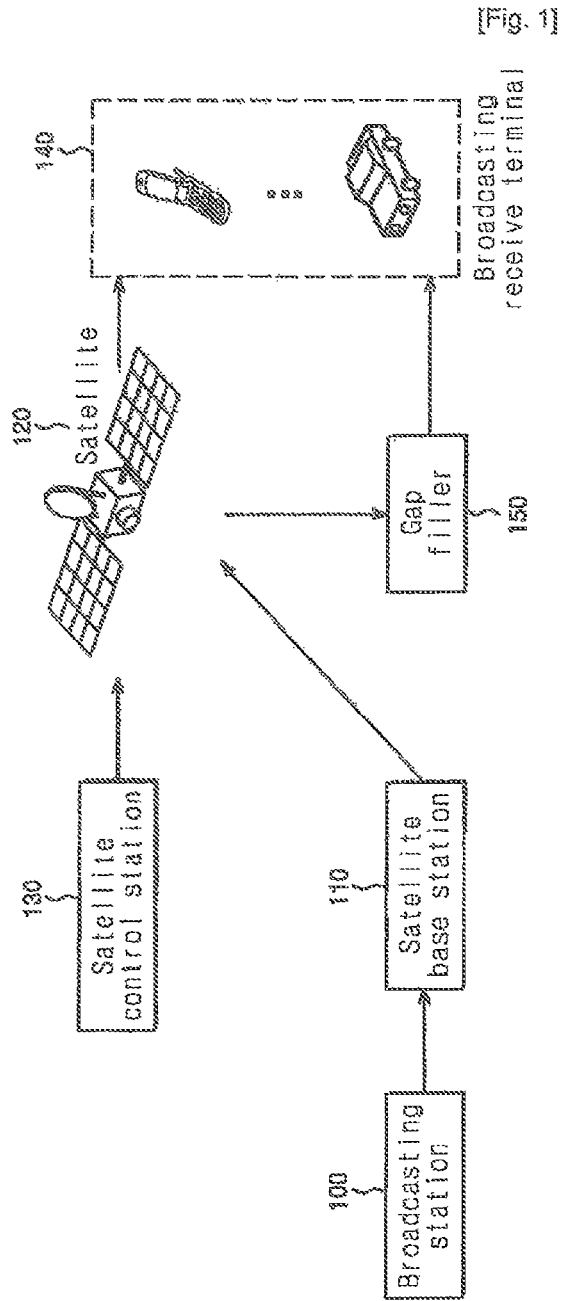
[Fig. 1]
PRIOR ART

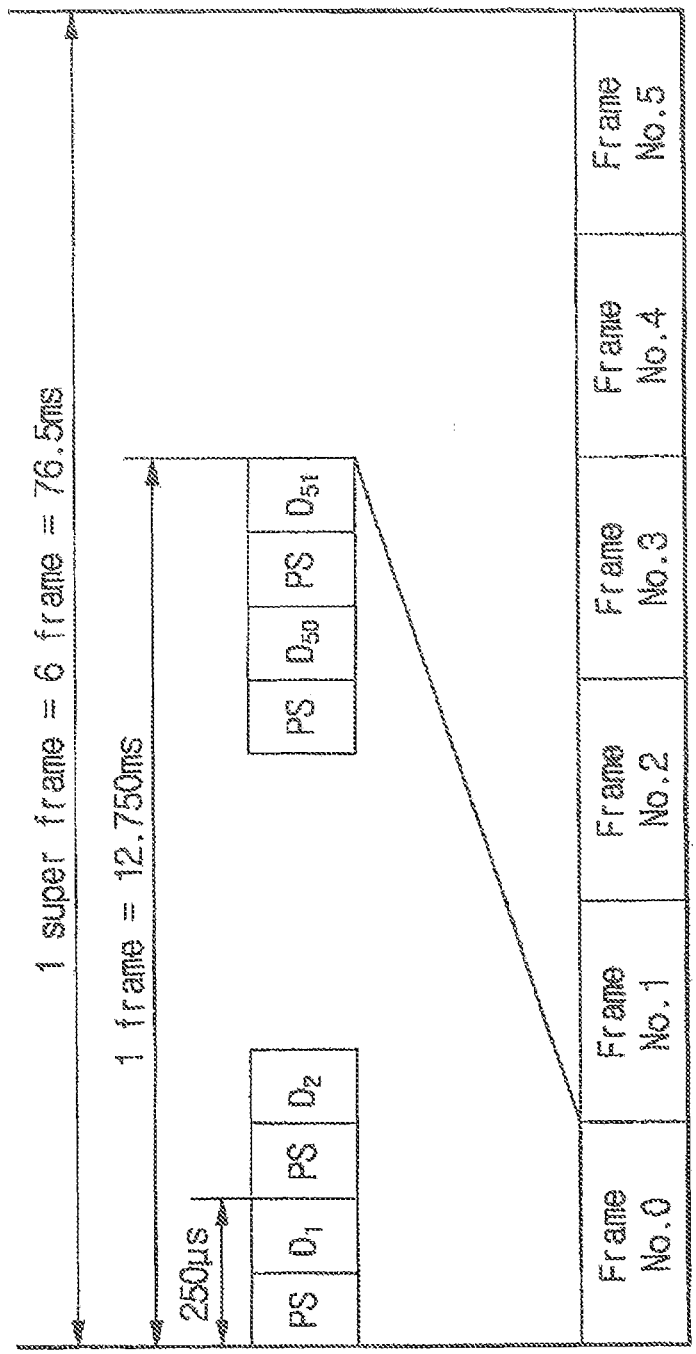

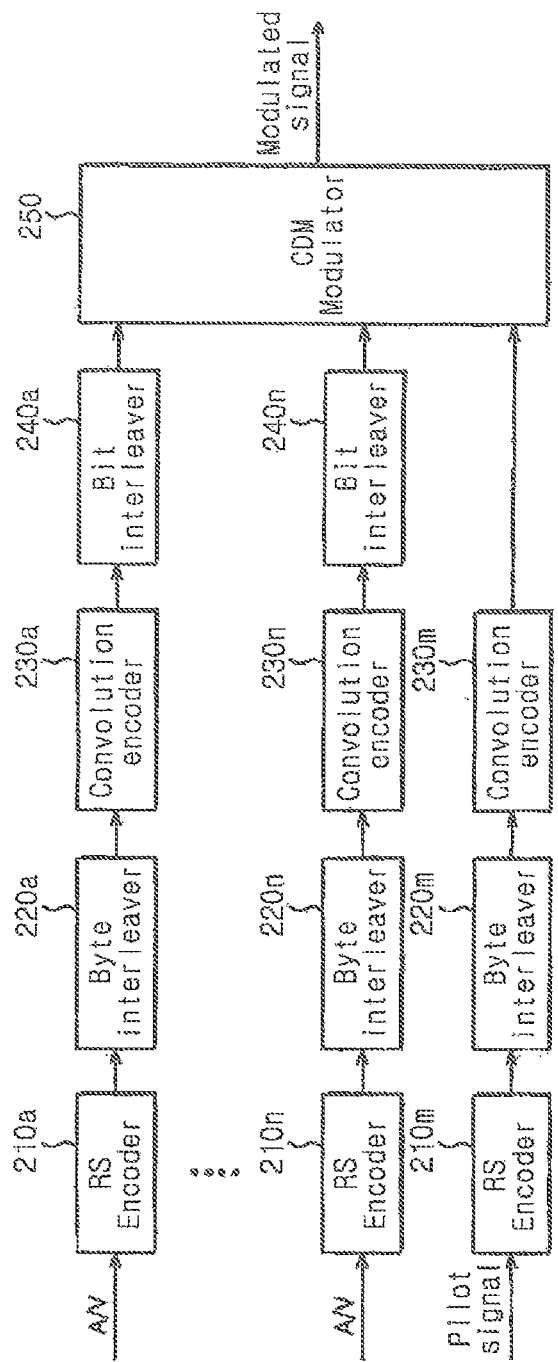
[Fig. 3]
PRIOR ART

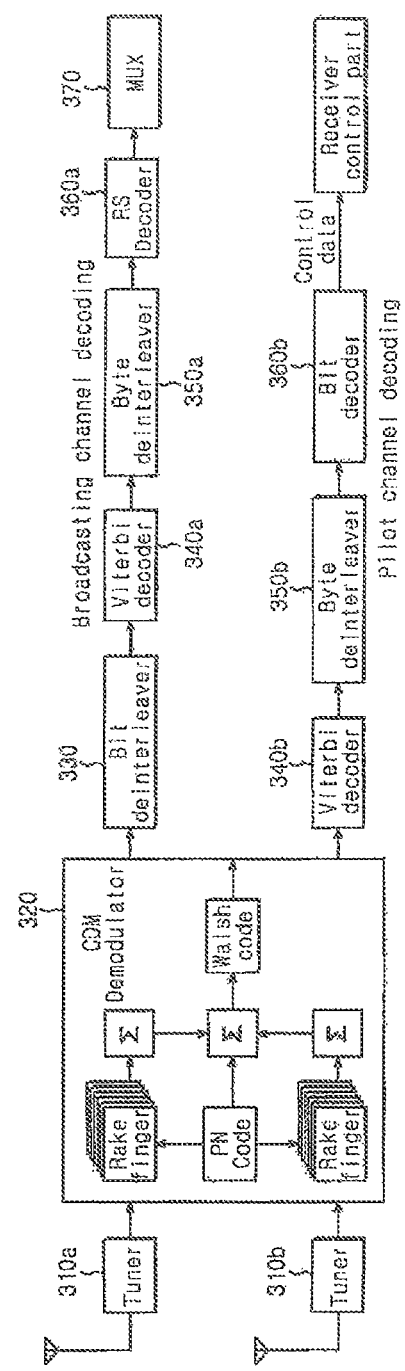
[Fig. 4]
PRIOR ART

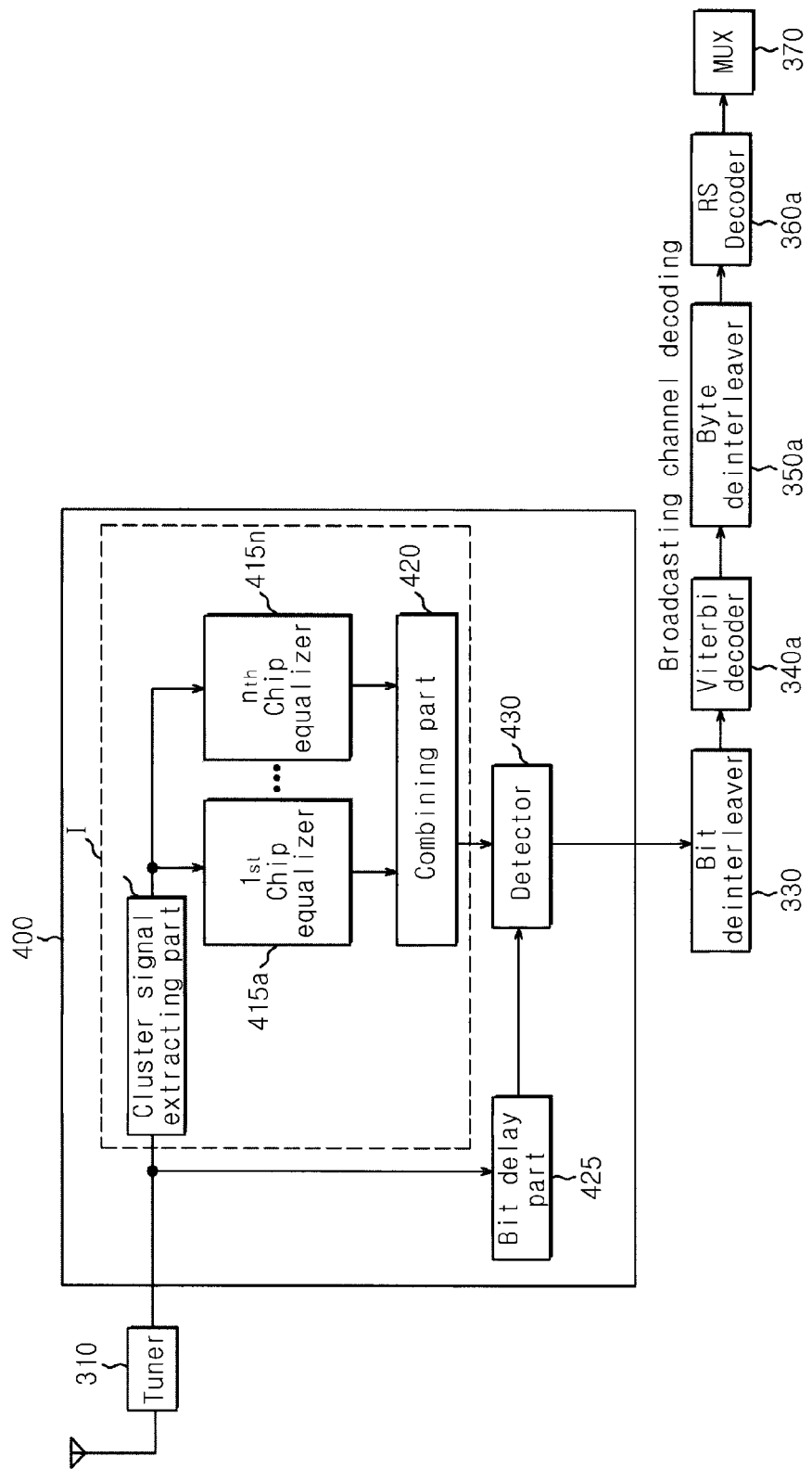
[Fig. 5]

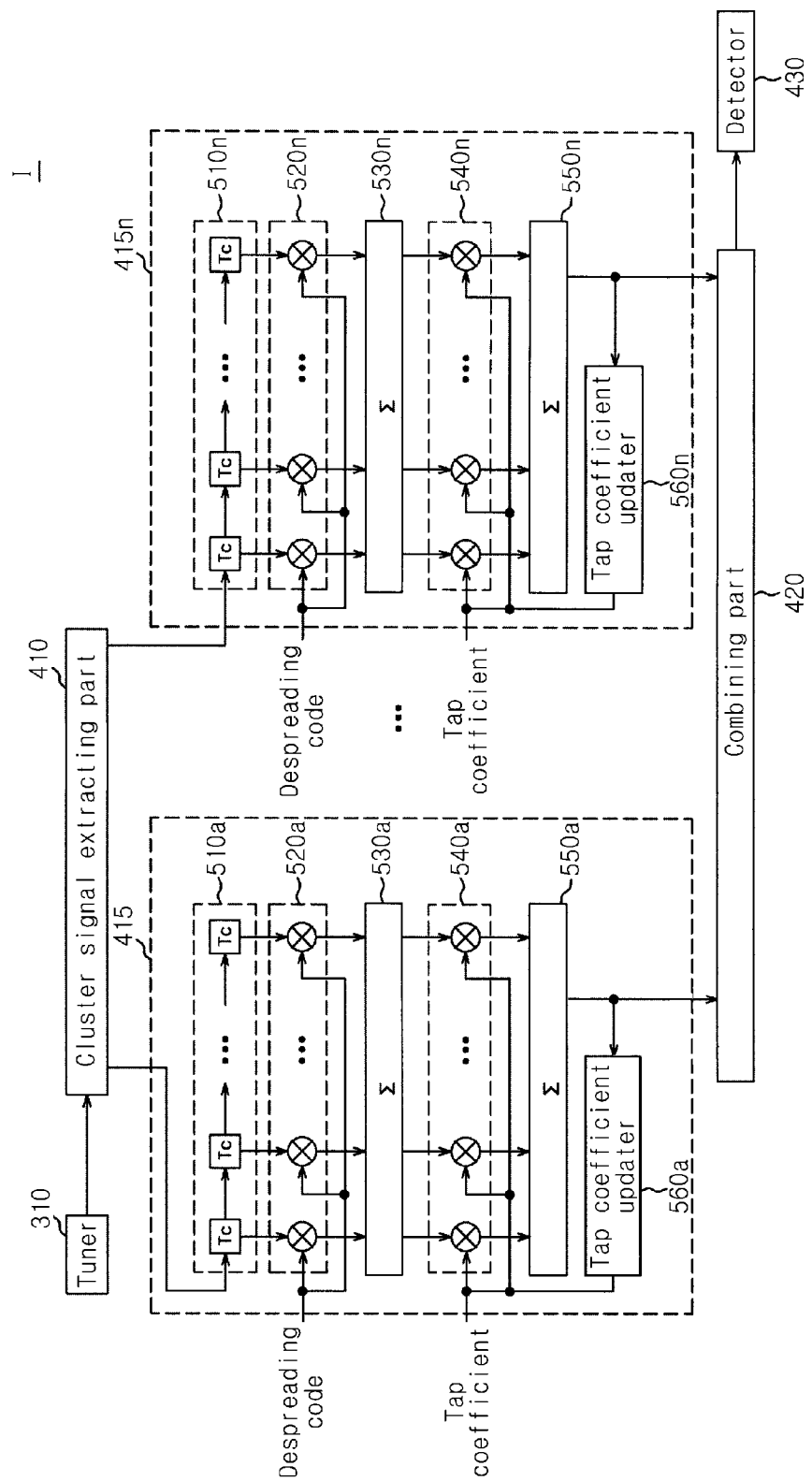
[Fig. 6]

CHIP EQUALIZATION APPARATUS AND METHOD THEREOF

TECHNICAL FIELD

The present invention relates to a chip equalization apparatus and method thereof. More particularly, the present invention relates to a chip equalization apparatus and method thereof, which selects some clusters with high signal power to extract a plurality of cluster signals among broadcast signal clusters continuously received in multi-path channels, equalizes each of the input cluster signals, and combines all equalized outputs again, thereby leading to low power consumption and efficient equalization.

BACKGROUND ART

As user's demand for digital broadcasting services providing high quality audio and video services increases, currently Digital Audio Broadcasting (DAB) programs are being broadcast or trial broadcast in many countries and regions including Europe and the United States of America, etc. Also, in Korea, terrestrial and satellite Digital Multimedia Broadcasting (DMB) services are provided.

FIG. 1 is a diagram to explain the concept of a conventional satellite broadcasting system.

Referring to FIG. 1, a satellite broadcasting system includes a broadcasting station 100, a satellite base station 110, a satellite 120, a satellite control station 130, a broadcasting receive terminal 140, and a gap filler 150.

The satellite base station 110 receives broadcast data from each broadcasting station 100 and transmits it to the satellite 120 through a Ku band (12.5-18 Ghz) uplink transmission line. The broadcasting station 100 transmitting the broadcast data to the satellite 120 through one or more satellite base station 110 may be plural.

Then the satellite 120 amplifies the Ku band broadcast signal received from the satellite base station 110, and converts it into an S band broadcast signal. The converted S band broadcast signal is sent out toward a service coverage together with the Ku band broadcast signal.

The satellite control station 130 monitors and controls operating state of the satellite 120.

The broadcasting receive terminal 140 located within a satellite broadcasting service coverage receives a broadcast signal from the satellite 120 to reproduce a broadcasting program. However, in an area with signal attenuation caused by shadowing or blocking by buildings, shields or masks, etc., the gap filler 150 relays and transmits a broadcast signal. That is, the gap filler 150 receives and converts a Ku band Time Division Multiplexing (TDM) signal from the satellite 120 into an S band Code Division Multiplexing (CDM) signal, and sends out them. The broadcasting receive terminal 140 located within a satellite broadcasting service coverage demodulates a higher power signal among the S band CDM signal from the satellite 120 and the S band CDM signal received via the gap filler 150, and reproduces it. The broadcasting receive terminal 140 may be a portable terminal (e.g., a mobile communication terminal, Personal Data Assistance (PDA), automobile-based terminal, etc.).

FIG. 2 is a diagram to explain the general frame structure of a base band transmission signal of a gap filler.

Referring to FIG. 2, a frame structure consists of 12.75 ms basic frames. 6 basic frames constitute 1 super frame of 76.5 ms. Each broadcasting channel is embedded on the QPSK signal composed of 816 bytes (6528 bits), which consists of 408 bytes for I (In-Phase) channel and 408 bytes for Q (Quadrature-phase) channel. A pilot channel allocated with Walsh Code 0 is used for frame synchronization and control data transmission, and Pilot Symbol (PS) and control data (Di) are formed in 25□ units, respectively. A single pilot channel frame is configured with 102 blocks of 32 bits (i.e. 125□, 2048 chips). That is, one pilot channel frame is composed of 51 pilot symbols and 51 control data (Di, i=1,2, . . . , 51) in total. The first control data D1 in the pilot channel is a unique word for frame synchronization. Pilot symbol is sent out in sequence of "1111111 11111111 11111111 11111111" and unique word D1 is sent out in sequence of "1101010 10110101 01011001 10001010". PS and D1 are pilot data the broadcasting receive terminal 140 recognizes.

FIG. 3 is a block diagram to explain the configuration of a conventional transmission system for satellite broadcasting.

Referring to FIG. 3, a satellite broadcasting transmission system comprises Reed-Solomon (RS) encoders ($210a$, . . . , $210n$, and $210m$), byte interleavers ($220a$, . . . , $220n$, and $220m$), convolution encoders ($230a$, . . . , $230n$, and $230m$), bit interleavers ($240a$, . . . , and $240n$), and a CDM modulator (250).

For independent broadcasting by broadcasting stations 100 and/or contents, the satellite broadcasting transmission system can transmit broadcast data up to 63 channels by using orthogonal spreading codes which are different from each other, and transmits received sync data and control data through pilot channels. Error correction coding system utilizes RS-Convolution concatenated codes, while error spread method utilizes byte/bit interleaving. Channel-encoded signals are subjected to a modulation operation in the CDM modulator 250. For modulation, the broadcasting channel adopts a QPSK system with a roll-off factor 0.22, and the pilot channel adopts a BPSK system.

FIG. 4 is a block diagram to explain the configuration of a conventional receiving system for satellite broadcasting.

Referring to FIG. 4, a satellite broadcasting receiving system comprises tuners ($310a$ and $310b$), a CDM Demodulator (320), a Bit Deinterleaver (330), Viterbi Decoders ($340a$ and $340b$), Byte Deinterleavers ($350a$ and $350b$), RS Decoders ($360a$ and $360b$), a multiplexer MUX (370), and so on. While FIG. 4 illustrated a system with a plurality of tuners $310a$ and $310b$, if a portable terminal is concerned, antenna diversity may not be implemented after giving consideration to its size and portability.

The CDM Demodulator 320 includes rake fingers that synthesize a signal by Maximal Ratio Combining (MRC) etc., according to power (or intensity) and delay of the signal, and despreads it by a Walsh code of a desired broadcasting channel.

Output signals of the CDM Demodulator 320 are divided into broadcast channel signals and pilot channel signals. The broadcast channel signals go through a channel decoding process and restored to audio data and video signals. The pilot channel signals go through a pilot channel decoding process and used as control data of the broadcasting receive terminal 140.

In general, satellite DMB using the satellite broadcasting transmission/receiving systems discussed earlier can cover broader areas than the terrestrial DMB. Also, the gap filler 150 may be used additionally in an urban area (especially downtown) where signal receive environment is relatively poor. Depending on a shadow area using the gap filler 150, however, a signal being received in a multipath channel environment is sometimes delayed and its frequency is spread. Consequently, a spread code of the received signal may not be orthogonal any more and Multi User Interface (MUI) may occur. In such case, desired broadcast information is not restored accurately.

Therefore, a chip equalization apparatus has been used in replace of the CDM Demodulator 320, and a chip equalizer in the apparatus is designed to be able to compensate a distorted channel by performing the channel compensation on complex weights of taps of the chip equalizer. In code division multiple access (CDMA) wireless system, the signal receive configuration requires as many chip equalizers as time delay in the multi-path channel so as to compensate channel distortion that is caused by multi-path channel. Although a long chip equalizer may be needed in the multi-path channel, it may cause other problems, e.g., the receiver becomes bulky and power consumption increases considerably, or the convergence speed of tap coefficients can be lowered.

DISCLOSURE OF INVENTION

Technical Problem

To solve the above-mentioned deficiencies of the prior art, it is an object of the present invention to improve the convergence speed of tap coefficients compared with using a long chip equalizer, by selecting some clusters with high signal power to extract a plurality of cluster signals among broadcast signal clusters being continuously received in multi-path channels, and updating tap coefficients with received individual cluster signals from a plurality of chip equalizers, and combining output signals from each one of the chip equalizers in a combining part to restore received signals.

Another object of the present invention is to provide a chip equalization apparatus and method featuring an efficient equalization performance at low power consumption by increasing the convergence speed of tap coefficients in the apparatus.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a chip equalization apparatus for use in a satellite broadcast receiving system, which includes a cluster signal extracting part for extracting a plurality of cluster signals from received broadcast signals; and a plurality of chip equalizers receiving cluster signals from the cluster signal extracting part and updating tap coefficients to compensate the broadcast signals.

Another aspect of the present invention provides a chip equalization method applied to a satellite broadcasting receiving system, wherein the method includes the steps of: a) extracting a plurality of cluster signals from received broadcast signals; and b) receiving each of cluster signals from a cluster signal extracting part and updating tap coefficients to compensate the broadcast signals.

Advantageous Effects

The chip equalization apparatus and method according to the invention selects some clusters with high signal power to extract a plurality of cluster signals among broadcast signal clusters continuously received in multi-path channels, equalizes each of the input cluster signals, and combines all equalization outputs, thereby lowering power consumption and facilitating the equalization performance.

BRIEF DESCRIPTION OF THE DRAWINGS

FIG. 1 is a drawing to explain the concept of a conventional satellite broadcasting system.

FIG. 2 is a drawing to explain the general frame structure of a base band transmission signal of a gap filler.

FIG. 3 is a block diagram to explain the configuration of a conventional transmission system for satellite broadcasting.

FIG. 4 is a block diagram to explain the configuration of a conventional receiving system for satellite broadcasting.

FIG. 5 is a block diagram to explain the configuration of a satellite broadcast receiving system to which an embodiment of the present invention is applied.

FIG. 6 is a detailed view of a chip equalizer and an combining part that correspond to I part in FIG. 5.

MODE FOR THE INVENTION

The advantages, features and aspects of the invention will become apparent from the following description of the embodiments with reference to the accompanying drawings, which is set forth hereinafter.

FIG. 5 is a block diagram to explain the configuration of a satellite broadcast receiving system to which an embodiment of the present invention is applied.

Referring to FIG. 5, a chip equalization apparatus 400 includes a cluster signal extracting part 410, a plurality of chip equalizers 415a, . . . , 415n (hereinafter 415), a combining part 420, a bit delay part 425, and a detector 430. The bit delay part 425 delays the received broadcast signal for a preset amount of time and outputs the delayed signal. The detector 430 compensates and removes channel information of a received bit signal by using a tap coefficient from the chip equalizer 415 to restore a broadcast signal which a receiver desires to reproduce.

A description on the cluster signal extracting part 410, the first chip equalizer, . . . , the n-th chip equalizer 415, and the combining part 420 included in I part in FIG. 5 will now be provided in detail with reference to FIG. 6.

FIG. 6 is a detailed view of the chip equalizer and the combining part that correspond to I part in FIG. 5.

In FIG. 6 it is not absolutely required to form all components of each chip equalizer 415 with hardware, but a kind of software program or System on Chip (SoC) may also be implemented.

Referring to FIG. 6, the cluster signal extracting part 410 is a device, which selects some clusters with high signal power among broadcast signal clusters in multi-path channels being continuously received through a tuner 310 in order to extract a plurality of cluster signals.

Each of the chip equalizers 415 comprises a unit delay part 510a, . . . , 510n (hereinafter 510) delaying a broadcast signal received through the cluster signal extracting part 410 at the chip intervals; a first multiplication part 520a, . . . , 520n (hereinafter, the first multiplier 520) applying a dispreading code to each of output signals from the respective output ends of the unit delay part 510; a first addition part 530a, . . . , 530n (hereinafter, the first adder 530) adding up all multiplication results of the first multiplier 520 to calculate a pilot signal including channel information; a second multiplication part 540a, . . . , 540n (hereinafter, the second multiplier 540) applying a tap coefficient to each of the signal added by the first adder 530; a second addition part 550a, . . . , 550n (hereinafter, the second adder 550) adding up all multiplication results of the second multiplier 540 to calculate a bit signal; and a tap coefficient update part 560a, ..., 560n (hereinafter, the tap coefficient updater 560) updating tap coefficients by step sizes that are obtained based on the calculated bit signal from the second adder 550 and a predetermined method.

The combining part 420 is a device to combine all outputs of the plural chip equalizers 415.

The following will now explain the operation of the chip equalization apparatus 400, given that there are two chip equalizers 415 (e.g., a first chip equalizer and a second chip equalizer).

The chip equalizer delays received bit signals spread with a Walsh code by using the chip unit delay block 510 at the chip intervals (Tc), and outputs the delayed signals to corresponding first multiplier 520, respectively.

The first multiplier 520 calculates a multiplication value by applying a dispreading code, which is composed of a Walsh Code 0 and PN code sequence, to the received bit signals being delayed correspondingly. For example, the first multiplier 520 respectively calculates 64 multiplication values and sends them to the first adder 530.

Then the first adder 530 adds all of the 64 multiplication values inputted from the corresponding first multiplier 520 to restore a channel compensated pilot signal.

Next, the first adder 530 respectively sends the restored pilot signal with channel compensation to the corresponding second multiplier 540.

The second multiplier 540 respectively multiplies the channel compensated pilot signal by a tap coefficient to compensate channel information.

Next, the second adder 550 respectively adds all the multiplication values (i.e. 64 multiplication values) received from the second multiplier 540 to compensate and remove channel information, and generates a restored bit signal.

Further, the second adder 550 sends the calculated bit signal to the tap coefficient updater 560 as well as the combining part 420. The tap coefficient updater 560 updates a tap coefficient and forwards the updated tap coefficient to the second multiplier 540.

The combining part 420 combines the plural output signals from the plural chip equalizers 415 in order to restore an original signal.

To be short, clusters with high signal power are selected among the broadcast signal clusters that are continuously received in multi-path channels to extract a plurality of cluster signals, and each of the cluster signals is inputted respectively to the plural chip equalizer. All output results are then combined for equalization. In this manner, power consumption is lower and the equalization can be performed more efficiently than using a single, lengthy chip equalizer.

Industrial Applicability

As has been explained so far, the chip equalization apparatus and method according to the principles of the present invention selects some clusters with high signal power among broadcast signal clusters continuously received in multi-path channels to extract a plurality of cluster signals, equalizes each of the cluster signals in the equalizer, and combines all the equalization results again, so that power consumption can be lowered and equalization can be done faster.

While the present invention has been described with respect to the specific embodiments, it will be apparent to those skilled in the art that various changes and modifications may be made without departing from the spirit and scope of the invention as defined in the following claims.

The invention claimed is:

1. A chip equalization apparatus for use in a satellite broadcasting receiving system, the apparatus comprising:
   a cluster signal extracting part for selecting a plurality of cluster signals from among a multiple number of other broadcast signal clusters being continuously received in multi-path channels such that each of the selected cluster signals have high signal power compared to the signal power of the non-selected broadcast signal clusters and for extracting only the plurality of the selected cluster signals from the multiple number of received broadcast signals;
   a plurality of chip equalizers for receiving the extracted cluster signals from the cluster signal extracting part in which each chip equalizer includes a tap coefficient update part for updating the tap coefficient to compensate the received broadcast signals; and
   a combining part for combining the compensated received broadcast signals outputted from the plurality of chip equalizers.

2. A chip equalization method applied to a satellite broadcasting receiving system, the method comprising the steps of:
   a) selecting a plurality of cluster signals from among a multiple number of other broadcast signal clusters being continuously received in multi-path channels such that each of the selected cluster signals have high signal power compared to the signal power of the non-selected broadcast signal clusters;
   (b) extracting only the plurality of the cluster signals selected in step (a) from the multiple number of received broadcast signal clusters;
   c) using a plurality of chip equalizers with each equalizer having a tap coefficient update part for updating the tap coefficients to compensate the received broadcast signals; and
   d) combining the compensated received broadcast signals outputted from the plurality of chip equalizers.

* * * * *